March 8, 1949.  G. V. WHITTLE  2,463,584
FINGER PATCH
Filed Feb. 4, 1946
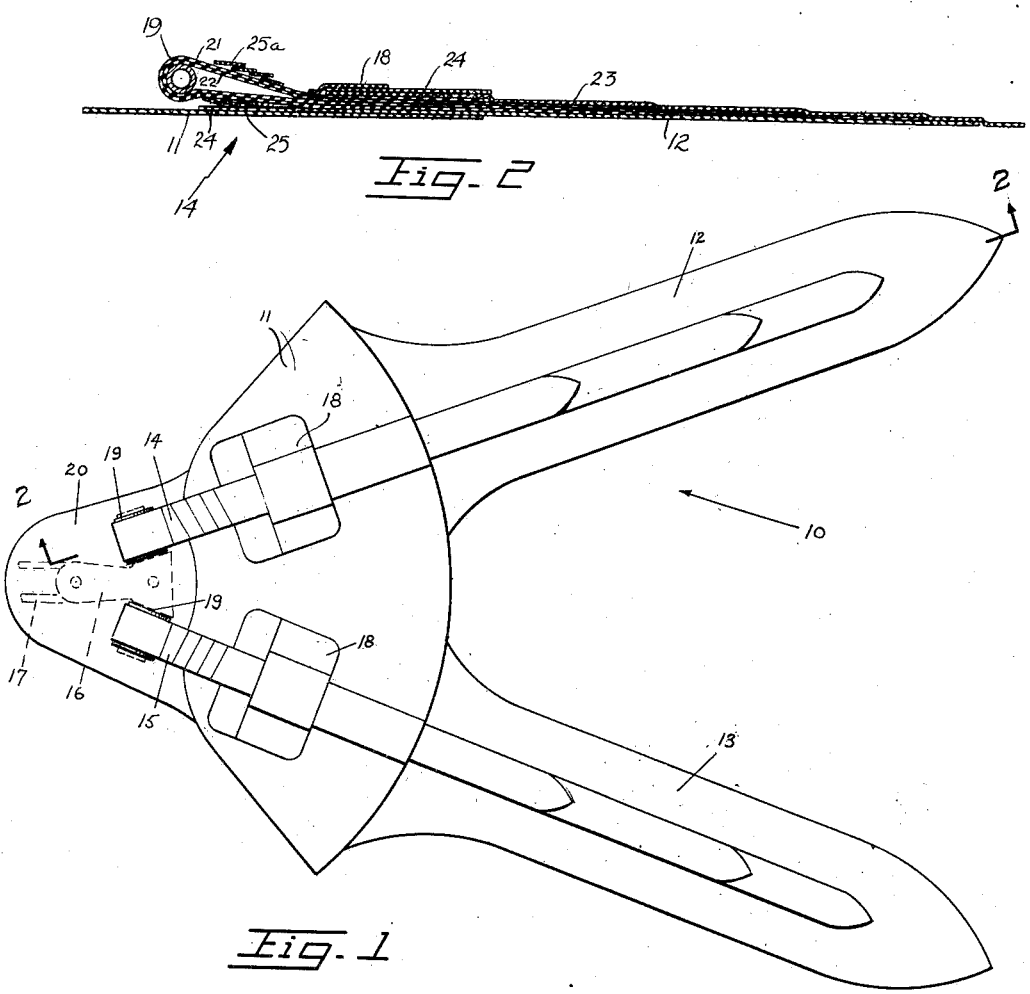
Fig. 2
Fig. 1
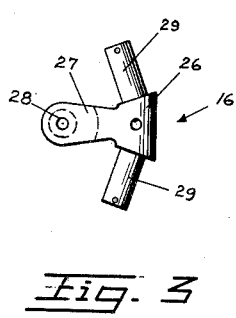
Fig. 3
INVENTOR.
GEORGE V. WHITTLE.
BY
M. O. Hayes
ATTORNEY.

Patented Mar. 8, 1949

2,463,584

UNITED STATES PATENT OFFICE 2,463,584

FINGER PATCH

George V. Whittle, United States Navy

Application February 4, 1946, Serial No. 645,425

15 Claims. (Cl. 244—127)

(Granted under the act of March 3, 1883, as amended April 30, 1928; 370 O. G. 757)

This invention relates in general to equipment for aircraft and in particular to a device for securing lines to lighter-than-air craft.

In using and landing lighter-than-air craft it is frequently necessary to secure a line thereto for purposes of mooring or for securing accessory equipment thereto. It has previously been found that under unusual weather conditions many types of mooring devices deteriorate rapidly, for example by mildewing, and, consequently, frequent failures occur. Accordingly, it is an object of this invention to provide a device for securing lines to lighter-than-air craft.

Another object is to provide a device that can be secured rigidly to lighter-than-air craft, such device incorporating a convenient means for securing lines to the aircraft.

Further objects and advantages of this invention, as well as its construction, arrangement and operation, will be apparent from the following description and claims in connection with the accompanying drawing, in which Fig. 1 is a plan view of a finger patch, showing a preferred embodiment of this invention;

Fig. 2 is an elevation in cross-section taken along the line 2—2 of Fig. 1; and

Fig. 3 is a plan view of a securing-pin adapted to be used with the device shown in Fig. 1.

A finger patch or fastening device generally designated 10 includes flap 11 having two arms or tails 12 and 13 extending therefrom at an acute angle with respect to one another and having a pair of mooring-strips 14 and 15 extending along the tails 12 and 13, along the body of the flap 11, and projecting therefrom. A securing-pin 16 is secured removably in the projecting ends of mooring-strips 14 and 15 and forms an intermediate connection between the finger patch 10 and line 17.

The tails or arms 12 and 13 are relatively flat members extending from the central flap 11 at an acute angle between about 15° and 75° with respect to each other, preferably between about 30° and 60°. In the preferred form of the invention shown in the drawing, these tails extend at an angle of about 40° with respect to one another. The mooring-strips 14 and 15 are secured along the surface of tails 12 and 13 and are bonded integrally therewith. The mooring-strips 14 and 15 also extend from tails 12 and 13 over the central flap 11, there likewise being secured integrally to the flap, and a short distance before their ends the mooring-strips 14 and 15 become separated from flap 11 and project freely therefrom. A patch 18 is placed on flap 11 at the point where each mooring-strip joins the flap and acts to bind the mooring-strip securely to the flap, thereby preventing tearing of the device. Accordingly, these patches 18 act as reinforcing members to add reserve strength to the device.

The device has been described as having various parts, including flap 11, tails 12 and 13, and mooring-strips 14 and 15. However, it is to be understood that there is no clear and distinct line of demarkation between one member and another but on the contrary there is an intimate bonding of the various members so that the device comprises, essentially, one unitary piece.

As the mooring-strips 14 and 15 are positioned on the flap 11 and tails 12 and 13, said mooring-strips 14 and 15 extend in substantially straight lines at an angle substantially equal to the angle between tails 11 and 12, terminating a short distance apart in loops that contain inserts 19 to receive pins 16. Optionally, an extension 20 on flap 11 lies beneath the ends of mooring-strips 14 and 15 to receive and absorb abrasion from the mooring line 17 or other portions of the mooring means.

Fig. 2 shows in greater detail the structure of the mooring-strip 14 (substantially the same structure as mooring-strip 15). The mooring-strip 14 comprises in general a double-thickness, elongated strip made of two layers 21 and 22 looped back on themselves and secured integrally to flap 11 and tail 12. Accordingly, in tail 12 there are four ends, two ends each respectively from members 21 and 22. Optionally, the location of these ends is staggered so that there is no abrupt ending at one position for the various pieces, but instead a tapering end. An overall covering layer 23 on the tails 12 and 13 and a similar layer 24 on the central flap 11 lend additional security to the structure and in addition provide a smoother surface to the device.

At the loop end of mooring-strip 14 a wedge-shaped block 25 is placed between layers 21 and 24 and serves to add stiffness as well as strength to the strip. A tape 25a or the like is wrapped around mooring-strip 14 and block 25 to secure the block in position. At the extreme end a collar on insert 19 is placed within the loop and serves to provide a solid contact member within the loop to receive pin 16.

The pin 16 shown in Fig. 3 comprises a body or central portion 26 having a mounting member 27 extending therefrom, the mounting member being adapted to receive a wire or line 17 or the like. This can be accomplished by providing an integral wheel-like mount 28 at one end of member 27.

Extending to the sides from body 26 are a pair of arms 29, which are inclined at an angle toward member 27. These arms 29 are placed at such an angle that they are substantially perpendicular to mooring-strips 14 and 15; according to the form of the invention shown, these arms 29 extend at angles of 70° with respect to member 27 and in the same plane therewith. The arms are adapted to fit relatively snugly within inserts 19 at the ends of mooring-strips 14 and 15 and yet to be rotatable within the inserts. Thus pin 16 can be pulled in any direction with respect to the mooring-strips.

The structural materials used for this device can be varied within relatively wide limits and the nature of the materials and substitutes therefor will be apparent to those skilled in the art. However, the following general materials are suggested: The mooring-strips 14 and 15 consist of strips of a tough flexible material such as a strong rubber, a reinforced rubber, a flexible fabric or the like. Such material must be strong and flexible and must be adapted to be secured firmly to the materials used for flap 11 and tails 12 and 13. Either natural or synthetic rubber, or other synthetic elastomers can be used for this purpose.

Flap 11 and tails 12 are constructed generally of types of material used for the construction of lighter-than-air craft. These include rubberized cloth or the like, preferably having an aluminum or aluminum-like coating thereon. Such material is characterized by being quite flexible and by having strength in the same general range as the structural materials used on lighter-than-air craft. The materials are likewise characterized by their property of properly receiving a glue or other adhesive with which they can be secured to a similar material.

Both the structural materials for flap 11 and tails 12 and 13 and the materials for mooring-strips 14 and 15, as well as other materials used in the construction of the device have weather-resistance and wear-resistance similar to construction materials of lighter-than-air craft. This result is attained, of course, by using the materials described hereinbefore. Since the device is to be attached to such a craft, superior wearing qualities are unnecessary; it is sufficient that the qualities of the material of the device be roughly equal to the qualities of the material of the lighter-than-air craft.

Pin 16 and inserts 19 are constructed of metal so that a durable metal-to-metal contact is maintained between the device 10 and the mooring or other line 17. Preferably, this metal is wear-resistant and corrosion-resistant. Additionally it is desirable to use a light metal to reduce weight. Accordingly, aluminum or an aluminum alloy, stainless steel or other metals can be used. Likewise, one can substitute a non-metallic member such as a tough and strong plastic material.

The use and operation of this device is apparent upon reference to Fig. 1. The flap 11 and tails 12 and 13 are secured firmly to a blimp or other lighter-than-air craft by means of a strong adhesive applied directly to the surface. A mooring line is secured to pin 16 as indicated in Fig. 1 and the pin is inserted in mooring-strips 14 and 15.

The device and the connections are firm and secure, resisting a pull in any direction. The angular location of arms 29 as shown in Fig. 3 insures that the pin will not be pulled from its mounting even by an irregular tension. It is also noted that the weakest point in the structure of the mooring-strips 14 and 15 is between the loop end and patches 18, so that an unusually high tension causes the strips to break in this intermediate area and prevents damage to the device as a whole or to the aircraft itself.

Various modifications and changes can be made in the subject device without departing from the scope of the invention.

The invention described herein may be manufactured and used by or for the Government of the United States of America for govermental purposes without the payment of any royalties thereon or therefor.

I claim:

1. An aircraft-securing device comprising a flap having two tails extending integrally therefrom; a relatively strong flexible strip mounted integrally along each tail and a securing-pin mounted on side mooring-strips and adapted to receive a line.

2. An aircraft-securing device comprising a flexible flap having two flexible tails extending integrally therefrom, a relatively strong flexible strip mounted integrally along each tail and a securing-pin mounted on said mooring-strips and adapted to receive a line.

3. An aircraft-securing device comprising a flexible flap having two flexible tails extending integrally therefrom at an acute angle with respect to each other, a relatively strong flexible strip mounted integrally along each tail and a securing-pin mounted on said mooring-strips and adapted to receive a line.

4. An aircraft-securing device comprising a flexible flap having two flexible tails extending integrally therefrom at an angle of about 40°, a relatively strong flexible strip mounted integrally along each tail and a securing-pin mounted on said mooring-strips and adapted to receive a line.

5. An aircraft-securing device comprising a flexible flap having two flexible tails extending integrally therefrom at an acute angle with respect to each other, said flap and tails comprising sheet materials of rubberized cloth having a flexible aluminum coating thereon, a relatively strong flexible rubberized strip mounted integrally along each tail, extending along said flap and projecting in a free end from the surface of said flap, a loop in each of said free ends having a collar-like insert mounted therein, and a securing-pin mounted removably in said inserts and adapted to receive a line.

6. An aircraft-securing device comprising a flap, two tails extending therefrom at an acute angle with respect to each other, and a strip mounted along each tail, extending along said flap and projecting in a free end from the surface of said flap, each of said free ends forming a loop.

7. An aircraft-securing device comprising a flap, two tails extending therefrom at an acute angle with respect to each other, a strip mounted along each tail, extending along said flap and projecting in a free end from the surface of said flap, a loop in each of said free ends having a collar-like insert mounted therein, and a securing-pin mounted in said inserts and adapted to receive a line.

8. An aircraft-securing device comprising a flap, a plurality of tails extending therefrom at an acute angle with respect to each other, and a plurality of strip assemblies, each assembly comprising a first strip looped upon itself and a second strip looped upon said first strip in staggered relation thereto, each assembly being mounted along one of said tails with the loop end thereof projecting from the surface of said flap.

9. An aircraft-securing device comprising a flap, a plurality of tails extending therefrom at an acute angle with respect to each other, and a plurality of strip assemblies, each assembly comprising a first strip looped upon itself and a plurality of strips looped upon said first strip in staggered relation thereto and to each other, said strip forming a multi-ply loop, each assembly being mounted along one of said tails with the loop end thereof projecting from the surface of said flap.

10. An aircraft-securing device comprising a flap, a plurality of tails extending therefrom at an acute angle with respect to each other, and a plurality of strip assemblies, each assembly comprising a first strip looped upon itself and a plurality of strips looped upon said first strip in staggered relation thereto and to each other, said strips forming a multi-ply loop, each assembly being mounted along one of said tails with the loop end thereof projecting from the surface of said flap and the opposite end thereof having successively fewer plies as it approaches the end of said tail distal said flap.

11. An aircraft-securing device comprising a flap, two tails extending therefrom at an acute angle with respect to each other, a strip mounted along each tail, extending along said flap and projecting in a free end from the surface of said flap, and a loop in each of said free ends, said strips being adapted to rupture from said tail upon application of a predetermined load of lower magnitude than the load adapted to rupture said flap and said tails from the envelope of the aircraft to which the device is secured.

12. An aircraft-securing device comprising a flap, two tails extending therefrom at an acute angle with respect to each other, a strip mounted along each tail, extending along said flap and projecting in a free end from the surface of said flap, said strips being adapted to rupture from said tail upon application of a predetermined load of lower magnitude than the load adapted to rupture said flap and said tails from the envelope of the aircraft to which the device is secured, a loop in each of said free ends having a collar-like insert mounted therein, and a securing-pin mounted in said inserts and adapted to receive a line.

13. An aircraft-securing device comprising a flap, a plurality of tails extending therefrom at an acute angle with respect to each other, and a plurality of strip assemblies, each assembly comprising a first strip looped upon itself and a second strip looped upon said first strip in staggered relation thereto, each assembly being mounted along one of said tails with the loop end thereof projecting from the surface of said flap, said assemblies being adapted to rupture from said tail upon application of a predetermined load of lower magnitude than the load adapted to rupture said flap and said tails from the envelope of the aircraft to which the device is secured.

14. An aircraft-securing device comprising a flap, a plurality of tails extending therefrom at an acute angle with respect to each other, and a plurality of strip assemblies, each assembly comprising a first strip looped upon itself and a plurality of strips looped upon said first strip in staggered relation thereto and to each other, said strips forming a multi-ply loop, each assembly being mounted along one of said tails with the loop end thereof projecting from the surface of said flap, said assemblies being adapted to rupture from said tail upon application of a predetermined load of lower magnitude than the load adapted to rupture said flap and said tails from the envelope of the aircraft to which the device is secured.

15. An aircraft-securing device comprising a flap, a plurality of tails extending therefrom at an acute angle with respect to each other, and a plurality of strip assemblies, each assembly comprising a first strip looped upon itself and a plurality of strips looped upon said first strip in staggered relation thereto and to each other, said strips forming a multi-ply loop, each assembly being mounted along one of said tails with the loop end thereof projecting from the surface of said flap and the opposite end thereof having successively fewer plies as it approaches the end of said tail distal said flap, said assemblies being adapted to rupture from said tail upon application of a predetermined load of lower magnitude than the load adapted to rupture said flap and said tails from the envelope of the aircraft to which the device is secured.

GEORGE V. WHITTLE.

REFERENCES CITED

The following references are of record in the file of this patent:

UNITED STATES PATENTS

| Number | Name | Date |
| --- | --- | --- |
| 1,272,058 | Kraft | July 9, 1918 |

FOREIGN PATENTS

| Number | Country | Date |
| --- | --- | --- |
| 18,338 | Great Britain | 1912 |
| 325,209 | Germany | Sept. 10, 1920 |
| 417,649 | France | Dec. 6, 1910 |

Certificate of Correction

Patent No. 2,463,584.   March 8, 1949.

GEORGE V. WHITTLE

It is hereby certified that errors appear in the printed specification of the above numbered patent requiring correction as follows:

Column 4, line 23, claim 1, for "side" read *said*; column 5, line 16, claim 9, for "strip" read *strips*;

and that the said Letters Patent should be read with these corrections therein that the same may conform to the record of the case in the Patent Office.

Signed and sealed this 30th day of August, A. D. 1949

[SEAL]

THOMAS F. MURPHY,
*Assistant Commissioner of Patents.*